Jan. 4, 1966  C. W. BOWEN, JR  3,227,006
POWER TRANSMITTING GEAR TRAIN
Filed Jan. 14, 1963  2 Sheets-Sheet 1
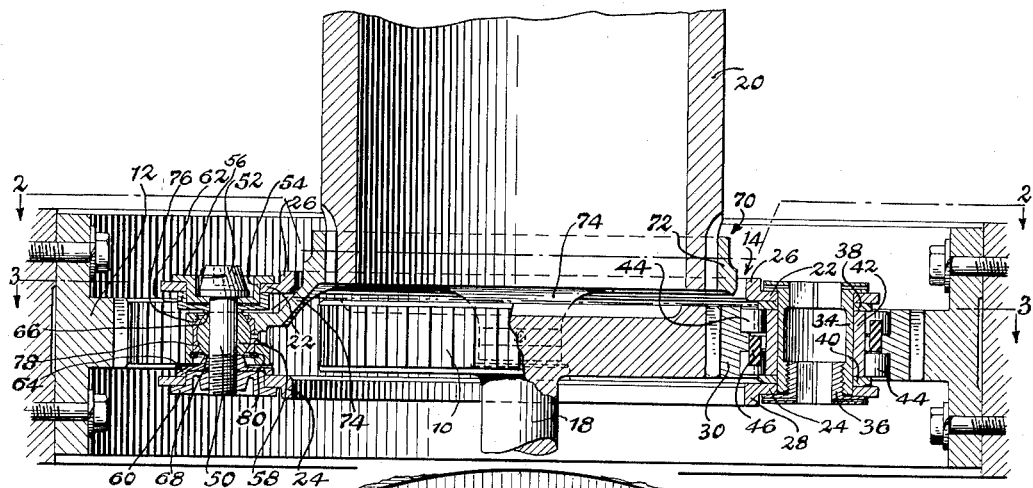
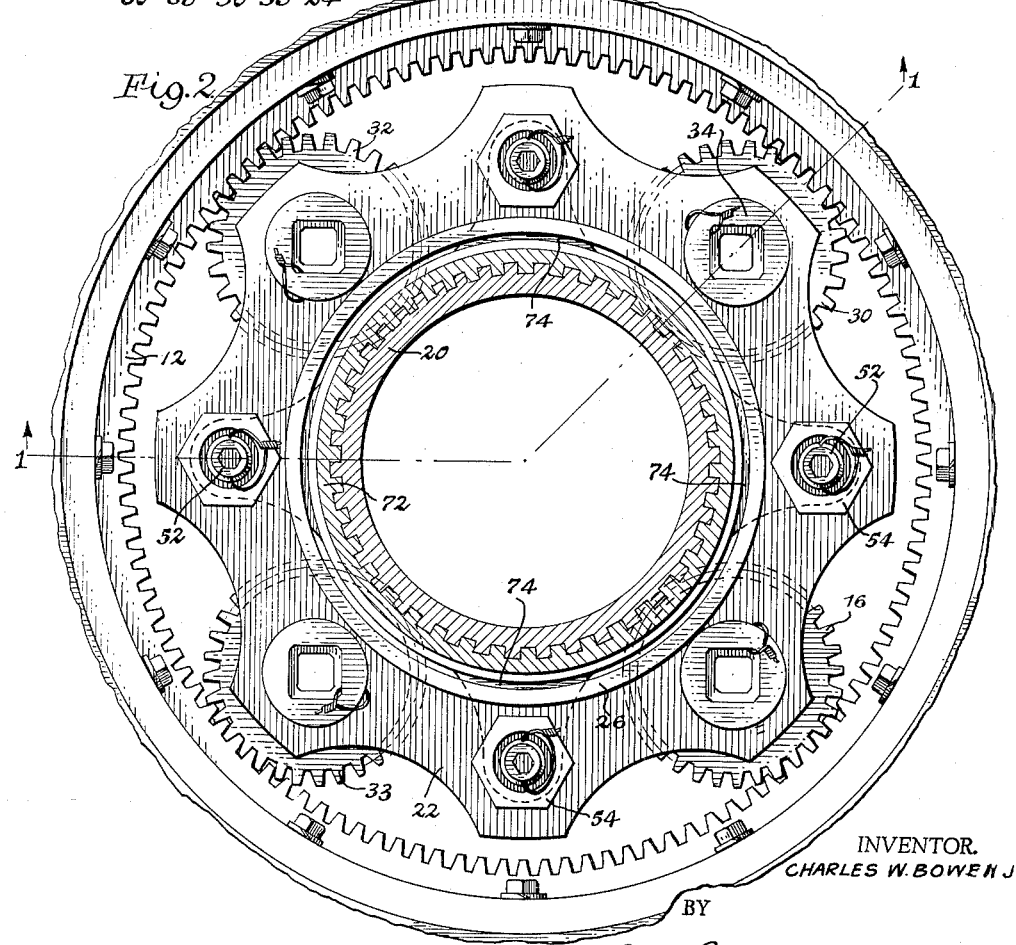
INVENTOR.
CHARLES W. BOWEN JR
BY
Beau, Brooks, Buckley & Beau
ATTORNEYS Jan. 4, 1966 C. W. BOWEN, JR 3,227,006
POWER TRANSMITTING GEAR TRAIN
Filed Jan. 14, 1963 2 Sheets-Sheet 2

INVENTOR.
CHARLES W. BOWEN JR.
BY
Bean, Brooks, Buckley & Bean
ATTORNEYS

United States Patent Office 3,227,006
Patented Jan. 4, 1966

3,227,006
POWER TRANSMITTING GEAR TRAIN
Charles W. Bowen, Jr., Arlington, Tex., assignor to Bell
Aerospace Corporation, Wheatfield, N.Y.
Filed Jan. 14, 1963, Ser. No. 251,308
11 Claims. (Cl. 74—801)

This invention relates to power transmitting gear trains in general and pertains, more particularly, to certain improvements in the planet or idler carrier assemblies utilized in conjunction with epicyclic gear trains.

In epicyclic gear trains, as for example in a planetary system, the problem of planet or idler gear misalignment under heavy loads is particularly troublesome since, as will be obvious, any misalignment will materially and greatly shorten the effective life of the gears involved. Normally, a plurality of the idler or planet gears are utilized and it is essential, in the first place, to distribute the load between these several gears evenly and, to this end, a certain degree of flexibility of the carrier assembly for these gears is desirable to permit the gears to naturally and inherently accommodate themselves to equal load sharing. However, this flexibility of the carrier gives rise to the aforementioned misalignment problem when the system is operated under heavy load, the misalignment being caused by the flexibility of the carrier assembly and being directly proportional to the load applied. If this problem is sought to be solved by rigidifying the carrier assembly, the problem of load sharing of the several planet or idler gears becomes acute. The reason for this is that as aforesaid, slight flexibility of the carrier assembly is desirable to attain equal load sharing whereas if a rigid carrier is utilized, the planet or idler gears would have to be very accurately aligned and positioned in order to accomplish equal load sharing. Thus, the problem of equal load sharing and misalignment are very closely interrelated and they have been a particularly troublesome area in this art for a considerable period of time. Naturally, various and sundry methods have been employed to alleviate these problems but, to my knowledge, none is capable of solving the problem without either creating other problems as a side effect or causing a material escalation in production cost. It is, accordingly, a primary objective of the present invention to provide an improved carrier assembly for the planet or idler gears of an epicyclic gear train wherein the problems of gear misalignment due to load and the problem of load sharing is efficaciously solved without either creating side effect problems or materially increasing the cost of production of the assemblage.

Generally speaking, the principles according to the present invention are accomplished by establishing drive to or from the planet or idler gears through the intermediary of pivot means which takes up any motion which would otherwise cause misalignment of such planet or idler gears. More specifically, the present invention relates to such mechanism wherein a carrier plate assembly is utilized for rotatably mounting the planet or idler gears thereon and wherein a drive member is associated with such carrier plate and connected thereto through flexible finger means which are joined to the carrier plate to that torque-induced flexure of the fingers does not impart a misaligning force or forces to the carrier plate. This permits the carrier plate to be constructed sufficiently flexible in and of itself as to permit the several planet or idler gears to establish equal load sharing.

Another object of the invention is to provide a carrier assembly for epicyclic gear trains including a carrier plate and drive assembly which are so interconnected as to obviate torque-induced misalignments of the carrier plate out of the rotational plane thereof while, at the same time, the carrier plate assembly is permitted of in plane distortion or flexure thereof to permit of equal load sharing by the idler or planet gears carried rotatably thereby.

Other objects and advantages of the invention will appear from the description hereinbelow and the accompanying drawing wherein:

FIG. 1 is a sectional view taken through a planetary gear system utilizing a carrier assembly constructed in accordance with the present invention;

FIG. 2 is a plan view of the carrier assembly;

Figure 3:
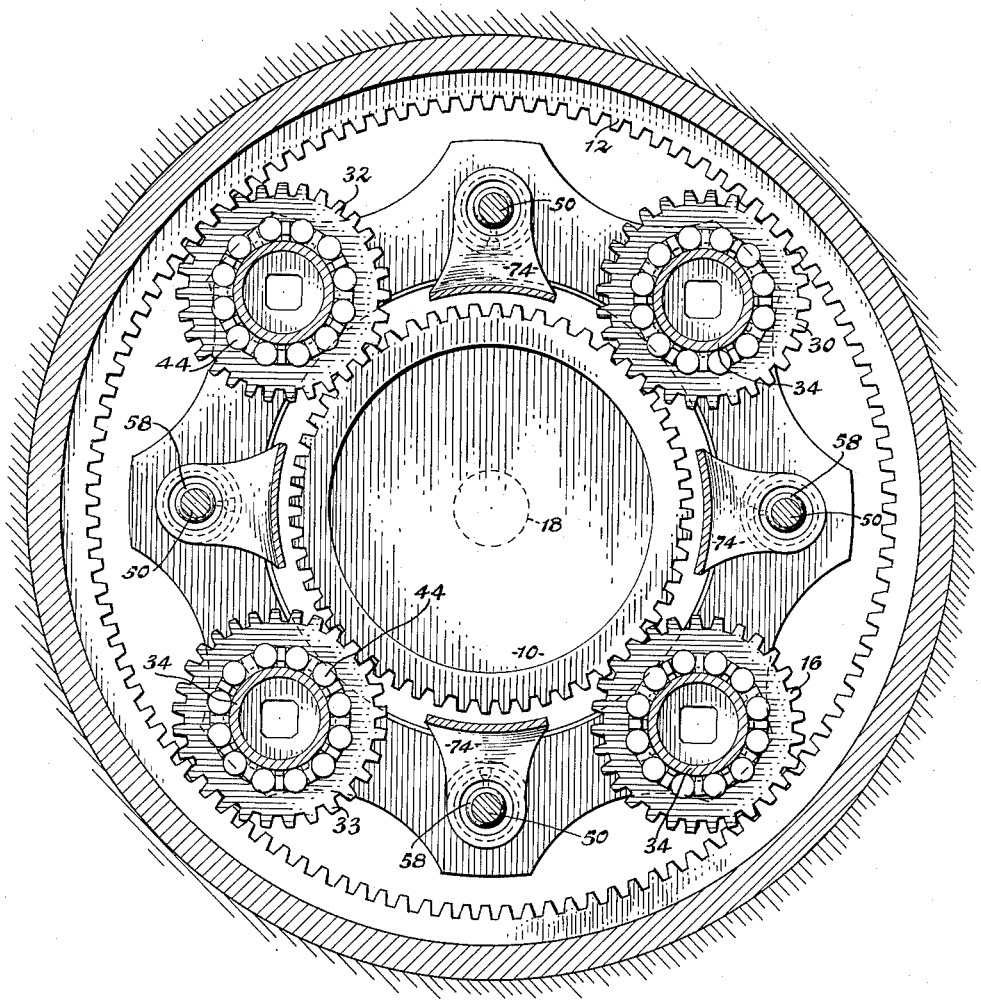
FIG. 3 is a horizontal section taken substantially along the plane of section line 3—3 in FIG. 1 showing further details of the carrier assembly.
Figure 4:
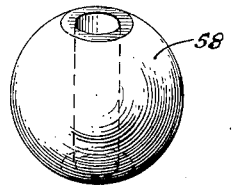
FIG. 4 is a perspective view of a ball joint member.

Referring at this time more particularly to FIGS. 1, 2 the present invention is shown specifically applied to a planetary gear system which includes the sun gear 10 and the fixed ring gear 12 and the planetary assembly indicated generally by the reference character 14. As is conventional, the sun and ring gears 10 and 12 are parallel and the planet or idler gears which mesh therebetween as indicated by the gear 16 in FIG. 2, are rotatably mounted of the planet assembly 14. In the particular case shown, power may be applied to the system through the medium of a drive shaft 18 which is rigid with the sun gear 10 and the power path out of the system is through the assembly 14 to an output shaft 20, substantially as is shown. Such a system, it will be realized, is, in general, of entirely conventional nature and arrangement and it will be further understood that the concept of the present invention need not necessarily be limited to precisely the gear arrangement as is shown in FIG. 1, the assembly as hereinafter disclosed being adapted for use with epicyclic gear trains in general. It will be further understood that the power input and output paths may be reversed from the above specific description thereof or other and different power path arrangements may be utilized, as desired.

The novel planetary assembly according to the present invention will be seen to consist of carrier plate means which, in the specific example shown, include a pair of spaced, parallel carrier plates or rings 22 and 24 which may be provided with stiffening ribs or flanges 26 and 28 at their inner margins and which plates rotatably mount therebetween, as can be seen from a study of FIGS. 2 and 3, a plurality of planet or idler gears including the previously mentioned gear 16 and the additional gears 30, 32 and 33. The plates 22 and 24 are rigidly interconnected by means of screwthreaded elements 34 and 36 joined as shown and sandwiching, between the opposed inner surfaces of the plates 22 and 24, the spacer washers 38 and 40 and the intervening inner race member 42. In the specific embodiment shown, a plurality of roller bearings 44 are interposed between the inner race 42 and the surfaces of the gears 16 etc. form the outer race of the bearing assembly, the rollers 44 being properly positioned and retained by the bearing cage member 46, as will be evident to those skilled in the art.

Also secured between the plates 22 and 24 are a plurality of pivot joint means which, in each instance, may take the form of a ball joint assembly as is shown in FIG. 1. As shown, each ball joint includes a bolt member 50 having its head 52 seated within the recess 54 of an upper cup member 56 which projects through a suitable opening in the plate 22, the bolt 50 projecting through both plates as shown and intermediately mounting a ball member 58 thereon. A nut member 60 of generally cup shaped configuration projects through a suitable opening in the plate 24 and is threadedly engaged with the end of the bolt 50 as shown serving to sandwich the inner cups 62 and 64, the spacer members 66 and 68 and the aforementioned ball member 58 therebetween. Thus, the pivot joint means serve additionally to join the plates 22 and 24 together in the specific embodiment shown. It is preferred, of course, that the several planet or idler gears be equidistantly spaced around the circumference of the rings 22 and 24 and that the pivot joint means be likewise equidistantly spaced from each other and from the several planet gears.

To effect drive either to or from the planet carrier plates, a coupling assembly indicated generally by the reference character 70 is utilized. In the specific embodiment shown, this coupling assembly includes an internally splined hub 72 by means of which power connection is effected between the hub and the shaft 20 and a plurality of radially extending fingers 74 project from the hub 72 and are pivotally connected to the carrier plate means through the medium of the aforementioned pivot joints. Specifically, this may be accomplished by means of the bearing cup members 76 and 78 held in place by a suitable circlip 80 or other retaining member and which cups embrace the aforementioned ball members 58. It will be noted that, preferably, the fingers 74 are relatively flexible, being relatively wide and relatively thin, as shown. Additionally, it will be seen that adequate clearance is provided between the outer ends of these fingers where they are joined to the carrier plate means by the ball joints so that compensatory movement between the fingers and the carrier plate means, as hereinafter more particularly set forth, may be achieved.

In the operation of the device, it will be appreciated that the carrier plate means will have sufficient in-plane flexibility as to permit the several gears 16, 30, 32 and 33 to establish equal load sharing. At the same time, it will be appreciated that torque load induced out-of-plane distortion or misalignment of the carrier plate means and consequent misalignment of the planet or idler gears is prevented by virtue of the pivot or joint connections between the fingers and the carrier plate means. More specifically, it will be realized that the fingers 74 are permitted to flex under conditions of heavy or high loads but that such flexure will not be reflected or imparted to the carrier plate means by virtue of the fact that the fingers are permitted of movement in the out-of-plane direction relative to the rotational plane of the carrier plate means. Thus, the torque-induced deformation or flexure of the fingers 74 as a result of the offset between the sun gear 10 and the hub 72 will not cause misalignment of the several planet or idler gears. Therefore, not only can the assembly be constructed to take maximum loads which would otherwise be impossible due to the probability of misalignment of the planet or idler gears, but also, the carrier plate means may be made sufficiently flexible, if desired, as to assure the equal load sharing by the several planet or idler gears involved.

I claim:
1. A planet carrier assembly for an epicyclic gear train, comprising,
   carrier plate means,
   planet gear means journalled on said carrier plate means,
   a drive member having a plurality of flexible fingers extending generally radially therefrom, and
   universal pivot means connecting said fingers to said carrier plate means and constituting the sole connection between said drive member and said carrier plate means.
2. A planetary gear system comprising, in combination,
   a sun gear and a ring gear disposed in concentric relation to each other,
   idler gear means meshing with said sun and ring gears, and
   a carrier assembly rotatably mounting said idler gear means,
   said carrier assembly including a carrier plate upon which said idler gear means is mounted, a drive member, a plurality of fingers rigid with said drive member, and ball joint means mounted on said carrier plate at points spaced circumferentially from said idler gear means and pivotally connecting the free ends of said fingers to said carrier plate.
3. A planet carrier assembly comprising, in combination,
   a pair of spaced carrier plates,
   means rigidly interconnecting said carrier plates,
   a plurality of planet gears disposed between said plates and rotatably supported therebetween,
   a drive member having a plurality of flat fingers projecting therefrom between said carrier plates, and
   ball joint means carried between said plates and pivotally connecting said fingers thereto.
4. In an epicyclic gear train having a pair of gear means, one of which is fixed and the other of which is rotatable, and idler gear means meshing with both of the first mentioned gear means and including a rotatable carrier plate,
   the improvement consisting of a drive member and means constituting the sole connection between said drive member and said carrier plate, the last mentioned means comprising a plurality of flexible fingers and a universal pivot joint associated with each finger to obviate torsion-induced misalignment of said idler gear means.
5. In a planetary gear system having an input member and an output member and planetary gear means coupling said members,
   said gear means including a sun gear fixed to one of said members, a planet gear assembly connected to the other of said members and a fixed ring gear,
   said planet gear assembly including a carrier plate having a plurality of planet gears rotatably mounted thereon and meshing with said sun and ring gears, and ball joint means mounted on said carrier plate in circumferentially spaced relation to said planet gears,
   and radial fingers rigid with said other member and connected to said carrier plate through said ball joint means.
6. In a planetary gear system having concentric sun and ring gears,
   carrier plate means,
   a plurality of planet gears rotatably mounted on said carrier plate means and meshing with said sun and ring gears,
   a drive member having a plurality of radially projecting fingers,
   and ball joint means connecting the free ends of said fingers to said carrier plate means at points circumferentially spaced from said planet gear.
7. A planetary gear train including
   a sun gear,
   a ring gear,
   a plurality of idler gears,
   an idler gear support member,
   a hub member having flexible portions attached to said idler gear support member through self-aligning universal pivot joints at points intermediate said idler gears.
8. A power transmitting planetary gear train comprising
   a sun gear and a shaft attached thereto,
   a ring gear,
   a plurality of idler gears,
   an idler gear support member,
   a hub,
   a shaft attached to said hub,
   said hub including flexible arms, each attached to said idler gear support member through a self-aligning universal pivot joints whereby under the transmitted of power through the gear train said flexible arms twist around said joints without causing misalignment of said idler gear.

9. In a planetary gear train including a sun gear and a shaft attached thereto, a ring gear, and an idler gear meshing with said sun and ring gears,
- an idler gear support member, and
- a hub member flexibly and pivotally attached to said idler gear support member at points circumferentially spaced from said idler gear whereby the deflections of the gear train are substantially absorbed by said flexible hub member.

10. In a planetary gear system having a sun gear, a ring gear and planet gears supported by a carrier assembly, the improvement consisting of connecting means between a drive member and said carrier assembly, said connecting means comprising a plurality of universal pivot means mounted on said carrier assembly at points circumferentially spaced from said planet gears, and a flexible member attached to each said pivot means and to said drive member, whereby drive forces through said planetary gear system will not cause substantial misalignment of said planetary gears.

11. A planet carrier assembly comprising, in combination,
- a pair of spaced carrier plates,
- means rigidly interconnecting said carrier plates,
- a plurality of planet gears disposed between said plates and rotatably supported therebetween,
- a drive member having a plurality of fingers projecting therefrom between said carrier plates, and
- ball joint means carried between said plates and pivotally connecting said fingers thereto.

References Cited by the Examiner

UNITED STATES PATENTS

| | | | |
|---|---|---|---|
| 1,950,971 | 3/1934 | Chilton | 74—801 |
| 2,095,794 | 10/1937 | Corbin | 74—410 X |
| 2,144,937 | 1/1939 | Ryder | 74—410 X |
| 2,491,172 | 12/1949 | Forsyth | 74—801 X |
| 2,498,295 | 2/1950 | Peterson et al. | 74—801 |
| 2,547,877 | 4/1951 | Lucia | 74—801 |
| 2,749,778 | 6/1956 | Kuhn | 74—801 |

FOREIGN PATENTS

| | | |
|---|---|---|
| 444,697 | 5/1927 | Germany. |
| 606,634 | 12/1934 | Germany. |

DON A. WAITE, *Primary Examiner.*